US010730115B2

(12) United States Patent
Amstibovitsky et al.

(10) Patent No.: US 10,730,115 B2
(45) Date of Patent: Aug. 4, 2020

(54) CUTTING TOOL FASTENER HAVING INTERNAL FLUID CHANNEL AND SPHERICAL HEAD ABUTMENT SURFACE

(71) Applicant: Iscar, Ltd., Tefen (IL)

(72) Inventors: Leonid Amstibovitsky, Kfar Vradim (IL); Grigori Neiman, Kiryat Ata (IL)

(73) Assignee: Iscar, Ltd., Tefen (IL)

( * ) Notice: Subject to any disclaimer, the term of this patent is extended or adjusted under 35 U.S.C. 154(b) by 108 days.

(21) Appl. No.: 16/194,645

(22) Filed: Nov. 19, 2018

(65) Prior Publication Data

US 2019/0160549 A1   May 30, 2019

Related U.S. Application Data

(60) Provisional application No. 62/591,875, filed on Nov. 29, 2017.

(51) Int. Cl.
*B23B 27/16* (2006.01)
*B23Q 11/10* (2006.01)
(Continued)

(52) U.S. Cl.
CPC .......... *B23B 27/1666* (2013.01); *B23B 27/04* (2013.01); *B23B 27/10* (2013.01);
(Continued)

(58) Field of Classification Search
CPC ............... B23B 2250/12; B23B 27/16; B23B 2200/0471; B23B 2205/04;
(Continued)

(56) References Cited

U.S. PATENT DOCUMENTS 3,946,473 A     3/1976  Petersen
4,427,322 A  *  1/1984  Kroll ................... B23B 27/1662
                                                    407/105
(Continued)

FOREIGN PATENT DOCUMENTS

DE        102013111852        5/2014

OTHER PUBLICATIONS

International Search Report dated Mar. 7, 2019, issued in PCT counterpart application (No. PCT/IL2018/051289).
(Continued)

*Primary Examiner* — Sara Addisu
(74) *Attorney, Agent, or Firm* — Womble Bond Dickinson (US) LLP (57) ABSTRACT

A cutting tool fastener having a rotation axis and configured to secure together, and establish a fluid path between, two cutting tool members, while also accommodating angular and pivotal displacement between the two. The fastener comprising a head with at least one head opening for emitting fluid, and a body which extends from the head and has a body opening for receiving fluid to be emitted via the head opening. The head has a spherical head abutment surface with a bottom spherical seal surface zone. At least a portion of the spherical head abutment surface faces the body, and the head opening opens out to the spherical head abutment surface. The bottom spherical seal surface zone is axially located between the body and the head opening.

25 Claims, 6 Drawing Sheets

(51) Int. Cl.
   *B23B 27/10* (2006.01)
   *B23B 27/04* (2006.01)

(52) U.S. Cl.
   CPC ... *B23B 2200/0471* (2013.01); *B23B 2205/04* (2013.01); *B23B 2240/24* (2013.01); *B23B 2260/03* (2013.01)

(58) Field of Classification Search
   CPC . B23B 2260/03; B23B 27/04; B23B 2240/24; B23B 27/10; B23B 27/1666; B23C 5/08; B23Q 11/10; B23Q 11/1076
   See application file for complete search history.

(56) References Cited

U.S. PATENT DOCUMENTS

| | | | |
|---|---|---|---|
| 5,340,242 A * | 8/1994 | Armbrust | B23B 25/02 407/11 |
| 7,273,331 B2 | 9/2007 | Giannetti | |
| 8,388,268 B2 | 3/2013 | Henry et al. | |
| 8,827,598 B2 | 9/2014 | Henry et al. | |
| 8,827,599 B2 | 9/2014 | Henry et al. | |
| 8,985,913 B2 | 3/2015 | Oren et al. | |
| 10,300,532 B2 * | 5/2019 | Chen | B23B 27/1677 |
| 2004/0240949 A1 * | 12/2004 | Pachao-Morbitzer | B23B 27/10 407/11 |
| 2006/0140728 A1 * | 6/2006 | Giannetti | B23B 27/10 407/11 |
| 2007/0283794 A1 * | 12/2007 | Giannetti | B23B 27/10 82/158 |
| 2007/0286689 A1 * | 12/2007 | Giannetti | B23B 27/10 407/11 |
| 2008/0080937 A1 * | 4/2008 | Hecht | B23B 29/043 407/42 |
| 2009/0123244 A1 | 5/2009 | Buettiker et al. | |
| 2011/0299944 A1 * | 12/2011 | Hofermann | B23B 27/1614 407/11 |
| 2012/0230780 A1 * | 9/2012 | Henry | B23B 29/043 407/11 |
| 2013/0051934 A1 * | 2/2013 | Henry | B23B 27/164 407/11 |
| 2013/0078043 A1 * | 3/2013 | Henry | B23B 27/10 407/11 |
| 2013/0129428 A1 * | 5/2013 | Henry | B23B 27/10 407/11 |
| 2013/0202372 A1 * | 8/2013 | Hecht | B23B 27/10 407/107 |
| 2013/0220089 A1 * | 8/2013 | Amstibovitsky | B23Q 11/1023 83/22 |
| 2014/0133924 A1 * | 5/2014 | Oren | B23B 29/043 407/11 |
| 2014/0270999 A1 | 9/2014 | Huang | |
| 2020/0030885 A1 * | 1/2020 | Mun | B23B 27/1611 |

OTHER PUBLICATIONS

Written Opinion dated Mar. 7, 2019, issued in PCT counterpart application (No. PCT/IL2018/051289).

* cited by examiner

CUTTING TOOL FASTENER HAVING INTERNAL FLUID CHANNEL AND SPHERICAL HEAD ABUTMENT SURFACE

RELATED APPLICATIONS

This application claims priority U.S. Provisional Patent Application No. 62/591,875, filed 29 Nov. 2017, the contents of which are incorporated by reference in their entirety.

FIELD OF THE INVENTION

The subject matter of the present application relates to machining or cutting tools. Specifically, it relates to coupling, adjoining of two portions of a cutting tool via a fastener having an internal fluid channel.

BACKGROUND OF THE INVENTION

Many popular turning tools have a turning inset secured in a pocket via a rigid clamp arrangement. Theses turning tools have a clamping screw which pulls and adjoins the clamp onto a tool body, such that the clamp in turn, secures an insert in a pocket. The clamping screw normally has a head with a flat head bottom surface, and an elastic neck which bends, to enable a pivotal displacement between the clamp and tool body. The pivotal displacement, or motion, is advantageous to improve coupling of the insert. This is achieved via the rigid clamp backwards movement, while pulling the insert into a pocket wedge, and also a downwards movement, towards the tool body, while pushing the insert towards a pocket base surface. The neck's elasticity (elastic deformation) is achieved via a relatively slim neck portion which extends between a head and a thread of the clamping screw. However, in these tools, this repeated elastic deformation is achieved at the price of lowered clamping forces as compared to clamping forces achieved with 'standard' clamping screws that are not required to elastically bend. Furthermore, plastic deformation can develop in the clamping screw which usually results in accelerated wear. Even further, these tools usually do not include fluid (e.g., coolant) conveyance, mainly due to the complex angular displacement and/or pivotal motion.

U.S. Pat. No. 7,273,331 discloses a turning tool with a turning inset secured in a pocket via a rigid clamp arrangement. The turning tool has a clamping screw which pulls and adjoins the clamp onto a tool body, such that the clamp pulls and secures an insert in a pocket. The clamping screw has flat head bottom surface. The turning tool also includes fluid conveyance via the clamping screw and through the rigid clamp. However, the rigid clamp of U.S. Pat. No. 7,273,331 cannot push the insert downwards, and provide the advantageous clamping disclosed hereinabove.

In summary, current clamping mechanisms provide at least two features. The first relates to rotational freedom of movement of the fastener which, after tightening, can receive any rotational end position. The second feature relates to the clamping of the insert via the clamp which requires a pivotal, or angular, displacement between the fastener and the clamp.

In addition to the abovementioned features, the current invention also provides fluid-conveyance, which has become a desired feature in the constantly-improving turning field. Although not a requirement, the current invention can also provide high-pressure fluid conveyance (normally above 70 BAR) which is considered a major advantage.

The present invention provides all three features—free-rotational freedom of movement, pivotal displacement and fluid conveyance, with little-to-none compromise in cost-efficiency and/or tool-life.

The present invention is intended to respectively overcome and solve the aforementioned disadvantages and problems.

SUMMARY OF THE INVENTION

In accordance with a first aspect of the subject matter of the present application there is provided a cutting tool fastener having a rotation axis and configured to secure together, and establish a fluid path between, two cutting tool members, while also accommodating angular and pivotal displacement between the two, the fastener comprising:
 a head comprising a head peripheral surface having at least one head opening for emitting fluid; and
 a body extending from the head and comprising:
  a body peripheral surface;
  a body opening for receiving fluid to be emitted via the head opening; and
  an internal fastener fluid channel extending at least partially along the rotation axis and in fluid-communication with the head and body openings;
 wherein:
  the head peripheral surface comprises a spherical head abutment surface, at least a portion of which faces towards the body,
  the spherical head abutment surface comprises a bottom spherical seal surface zone;
  the head opening opens out to the spherical head abutment surface; and
  the bottom spherical seal surface zone is axially located between the body and the head opening.

In accordance with a second aspect of the subject matter of the present application there is provided a cutting tool clamp, comprising:
 an elongated base portion having a clamp peripheral surface extending between a top clamp end and a bottom clamp end, and comprising:
  a receiving recess opening out to the clamp peripheral surface at the top clamp end, and
  a fastener hole connected to the receiving recess and opening out at the bottom clamp end; and
 an elongated clamping portion extending transversely from the elongated base portion, and comprising:
  a forward clamp end; and
  a clamping portion channel extending between a clamping portion inlet in fluid communication with the receiving recess and a clamping portion outlet at the forward clamp end;
 wherein:
  the receiving recess comprises a spherical seating surface;
  the clamping portion inlet opens out to the spherical seating surface; and
  the fastener hole (88) opens out to the spherical seating surface.

In accordance with a third aspect of the subject matter of the present application there is provided a turning tool which comprises:
 a tool body having a clamp recess and an insert pocket;
 a cutting tool clamp having a receiving recess;
 a turning insert secured in the pocket by the clamp; and
 the cutting tool fastener, occupying the receiving recess and securing the cutting tool clamp to the tool body.

In accordance with a fourth aspect of the subject matter of the present application there is provided a fluid-conveyance cutting tool coupling which comprises:
 a first cutting tool member;
 a second cutting tool member having a concave receiving recess comprising a spherical seating surface; and
 the fastener securing the second cutting tool member and the first cutting tool member to one another while simultaneously establishing a fluid path therebetween; wherein:
 the spherical head abutment surface of the fastener abuts the spherical seating surface of the second cutting tool member; and
 the fastener and the cutting tool members are configured such that the cutting tool members are secured to one another and the fluid path therebetween established, over a range of relative angular positions between the two cutting tool members.

In accordance with a fifth aspect of the subject matter of the present application there is provided a turning tool which comprises:
 a tool body having a clamp recess and an insert pocket;
 the cutting tool clamp occupying the clamp recess:
 a turning insert secured in the pocket by the clamp; and
 a cutting tool fastener occupying the clamp's receiving recess and securing the clamp to the tool body.

In accordance with a sixth aspect of the subject matter of the present application there is provided a cutting tool clamping assembly, comprising, in combination:
 the cutting tool fastener and the cutting tool clamp.

In accordance with a seventh aspect of the subject matter of the present application there is provided a turning tool comprising:
 a tool body having a clamp recess and an insert pocket;
 the cutting tool fastener;
 the cutting tool clamp occupying the clamp recess; and
 a turning insert secured in the insert pocket by the cutting tool clamp;
 wherein:
 the cutting tool fastener occupies the clamp's receiving recess and secures the clamp to the tool body;
 the spherical head abutment surface is seated on the spherical seating surface;
 the spherical seating surface and the spherical head abutment surface have the same radius; and
 the spherical head abutment surface, the spherical seating surface, and the displacement area in the fastener hole allow for angular displacement between the fastener and the clamp thereby forming a ball-and-socket joint.

Any of the following features, either alone or in combination, may be applicable to any of the above aspects of the subject matter of the application:
 The bottom spherical seal surface zone can extend 360 degrees about the rotation axis.
 The spherical head abutment surface can include a head fluid collector; and the at least one head opening opens out indirectly to the spherical head abutment surface via the head fluid collector.
 The head fluid collector can extend circumferentially for 360 degrees about the head peripheral surface.
 The at least one head opening can open out directly to the spherical head abutment surface.
 The fastener can be a screw which comprises a male thread formed on the body peripheral surface and extends along the rotation axis; and the head has a driving arrangement.

The fastener can further include a non-threaded neck which extends between the head and the male thread, along the rotation axis.
 The spherical head abutment surface can further include a top spherical seal surface zone located above the head opening, away from the body.
 The top spherical seal surface zone can extend 360 degrees about the rotation axis.
 The head peripheral surface can include a circumferentially extending friction reducing relief surface which is inwardly recessed from an imaginary spherical extension of the spherical head abutment surface.
 The friction reducing relief surface can be connected to the top spherical seal surface zone.
 The friction reducing relief surface is located above the head opening away from the body.
 The head can further include a circumferentially extending sealant recess formed in the head peripheral surface above the head opening, and away from the body; and the sealant recess is configured to receive a sealing member for forming a seal.
 The body can include exactly a single body opening.
 The head can include exactly four head openings.
 The head is wider than the body in a direction perpendicular to the rotation axis.
 The receiving recess can include a recess fluid collector.
 The spherical head abutment surface and the spherical seating surfaces have the same radius.
 The cutting tool clamp can further include:
 a circumferentially extending recess fluid collector formed in the spherical seating surface and in fluid communication with the clamping portion inlet.
 In a top view of the receiving recess, the recess fluid collector can extend more than 180 degrees in a circumferential direction, with the clamping portion inlet at its center.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figures 14, 15:
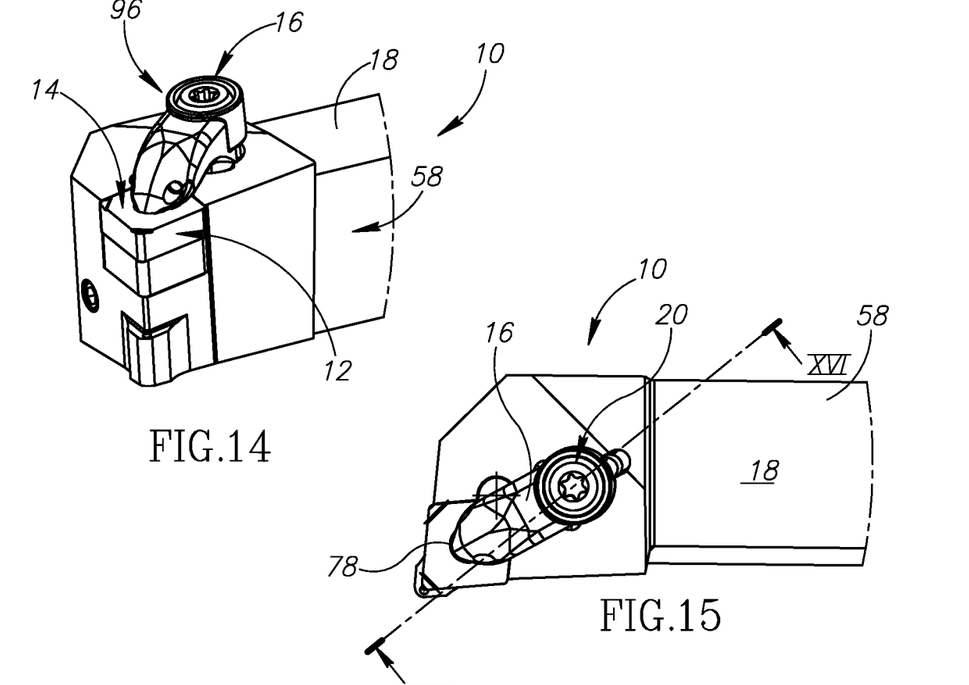
FIG. 14 is an isometric view of a turning tool which includes the fastener of FIG. 1 and a clamp.
FIG. 15 is a top view of the turning tool of FIG. 14.
Figure 16:
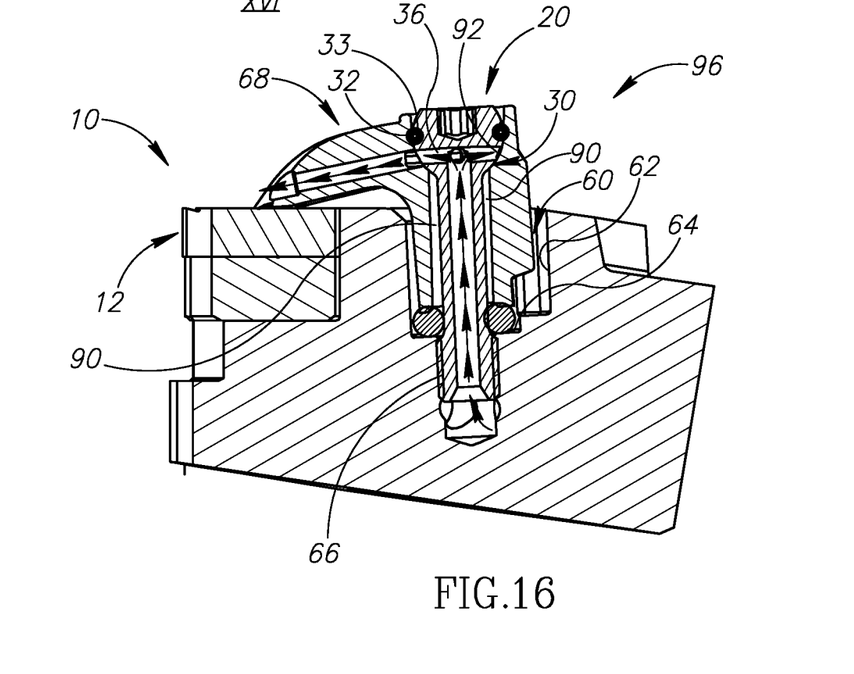
FIG. 16 is a cross-sectional view taken along line XVI-XVI of FIG. 15.

Attention is drawn to FIGS. 14-16. According to the present embodiment, a turning tool 10 includes a turning insert 12 which is seated in a pocket 14. The turning tool 10 has a fluid-conveyance cutting tool coupling 96. It is understood that fluids conveyed may be in the form of a liquid, such as liquid coolant or a liquid lubricant. Alternative, the liquid conveyed may be in the form of a gas, such as pressurized air or MQL (Minimum Quantity Lubricant). According to the present embodiment the cutting tool coupling 96 includes a tool body 18 and a clamp 16 which is coupled thereto via a fastener 20. The turning insert 12 is secured in the pocket 14 via the rigid clamp 16. The turning tool 10, and consequently the cutting tool coupling 96, also includes a fluid conveyance arrangement via the clamp 16, through the fastener 20 and the tool body 18. According to the present embodiment, the fastener 20 is configured to secure the rigid clamp 16 while conveying fluid internally and allowing angular (rotational) and pivotal displacement between the rigid clamp 16 and the tool body 18. Allowing said angular and pivotal displacement while also maintaining fluid pressure and minimizing or preventing leakage is achieved via a spherical engagement between the fastener 20 and the clamp 16.

Attention is drawn to FIG. 1-13. The fastener 20 is elongated and has a head 22 and a fastener body 24 which extends from the head 22. The fastener 20 has a rotation axis A which extends in an elongation direction.

The head 22 includes a head peripheral surface 26 which extends between the fastener body 24 and a head top surface 28.

The head peripheral surface 26 has a spherical head abutment surface 30, which serves as a sealing surface when the fastener 20 is seated on a complementary spherical seating surface 92 of the clamp 16, as discussed further below. It is noted that when used throughout the text to describe surfaces, the term 'spherical' relates to the shape of a sphere. In other words, the term relates to surfaces which lay in an imaginary sphere (see reference circle C in FIG. 13), and follow, within production tolerances, the spherical shape of the sphere. It is further noted that these spherical surfaces are not complete spheres, and only parts of a sphere, since e.g., the spherical head abutment surface 30 has at least one opening and can have a groove.

At least a portion of the spherical head abutment surface 30 extends 360 degrees about the rotation axis A. The head 22 is wider than the body 24. In other words, in any cross section taken along the rotation axis A, the head 22 has a larger dimension in a direction perpendicular to the rotation axis A. The spherical head abutment surface 30 is outwardly convex. At least a portion of the spherical head abutment surface 30 faces towards the fastener body 24.

According to a first embodiment (FIGS. 1-4), the head peripheral surface 26 includes a top spherical seal surface 38 which serves as a primary seal, as will be explained below. The head peripheral surface 26 further includes a sealant recess 32 located axially above the seal surface 38 which is configured to accommodate a sealing member 33. For example, the sealing member 33 can be a sealing O-ring (FIG. 16). The sealant recess 32 opens out to the head spherical surface 26. Generally, the sealing member 33 can be configured to either prevent leakage, if used as a primary seal, or assist with preventing minor, supplemental leaks when used as a supplemental, or secondary seal. According to the first embodiment, the sealant recess 32 and sealing member 33 serve as secondary seal. The sealant recess 32 is located farther from the body 24, above the spherical head abutment surface 30.

According to a second embodiment (FIGS. 5-8), the head 22 does not include a sealant recess 32 and a sealing member 33. The head peripheral surface 26 includes the top spherical seal surface 38 which serves as a primary seal and a relief surface 42 as will be discussed below.

The head 22 includes at least one head opening 34, which, according to the first embodiment is a head outlet 34, through which the fluid exits. According to the present embodiments, the head 22 has exactly four head outlets 34. During experiments, it was found that four outlets 34 provided a good balance between transferred fluid (e.g., liquid coolant) flow and structure integrity/rigidity for the fastener 20 sizes that were tested.

In the first embodiment of FIGS. 1-4, the head outlet 34 opens out directly to the spherical head abutment surface 30. In this embodiment, the spherical head abutment surface 30 completely surrounds the head outlet 34.

In the second embodiment of FIGS. 5-8, the head outlets 34 open directly into a head fluid collector 36 formed in the spherical head abutment surface 30. Each head outlet 34 therefore opens out indirectly to the spherical head abutment surface 30. The head fluid collector 36 comprises a groove in the head peripheral surface 26, and is configured to temporarily accumulate, or collect, fluids.

The spherical head abutment surface 30 can include a top spherical seal surface zone 38, and a bottom spherical seal surface zone 40, both of which are located respectively above and below (in an axial direction parallel to, or along, the rotation axis A) the head outlets 34. The top and bottom seal surface zones 38, 40 can be axially spaced apart from the head outlets 34. Each of the top and bottom spherical seal surface zones 38, 40 lays on a spherical surface and is designed to act as a so-called abutment-buffer, which provides fluid seal when the fastener 20 is sealed and fastened tightly with respect to the fastener body 24, and comes in abutment-contact with a corresponding concave spherical surface of the clamp 16, as will be further disclosed below. The top and bottom spherical seal surface zones 38, 40 extend 360 degrees about the rotation axis A.

Figure 1:
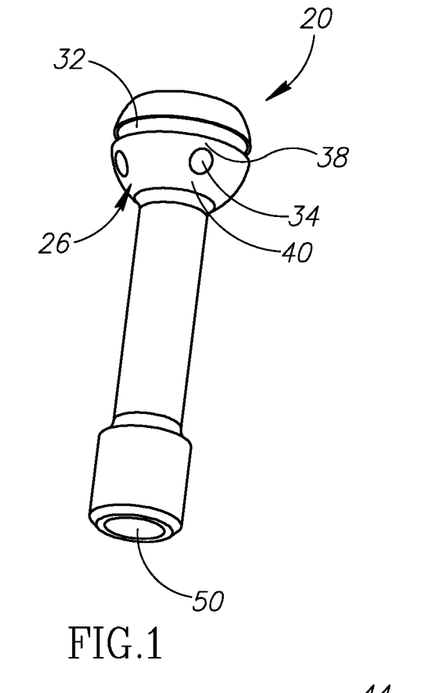
FIG. 1 is an isometric view of a first embodiment of a fastener with a sealant recess.
Figure 2:
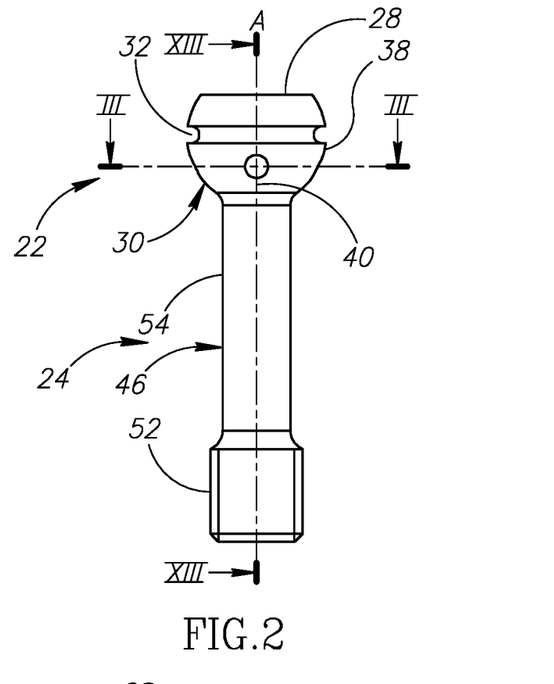
FIG. 2 is a side view of the fastener of FIG. 1.
Figure 3:
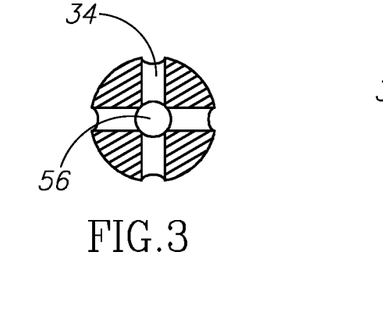
FIG. 3 is a cross-sectional view taken along line of FIG. 2.
Figure 4:
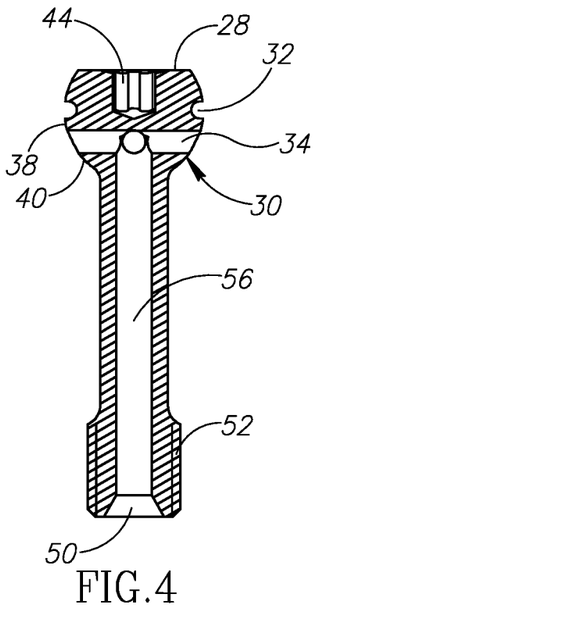
FIG. 4 is a cross-sectional view taken along line IV-IV of FIG. 2.
Figure 5:
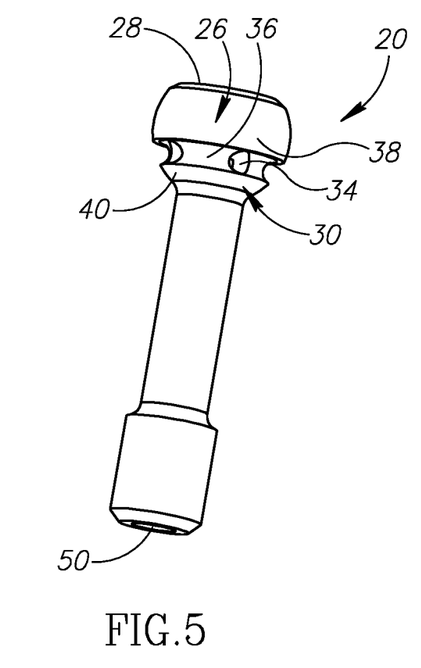
FIG. 5 is an isometric view of a second embodiment of a fastener with a fluid collector.
Figure 6:
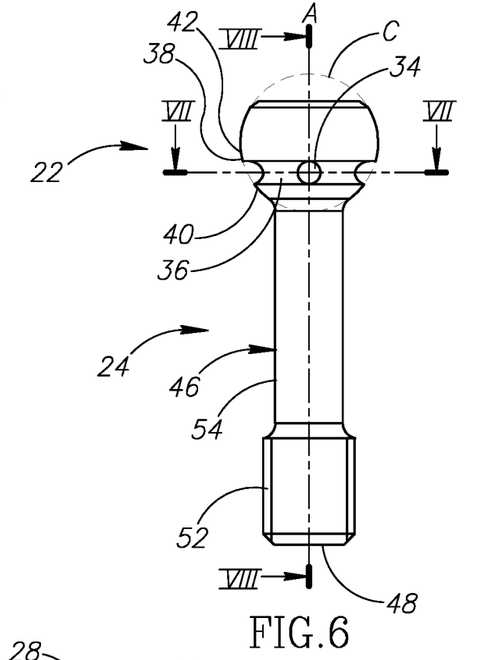
FIG. 6 is a side view of the fastener of FIG. 5.
Figure 7:
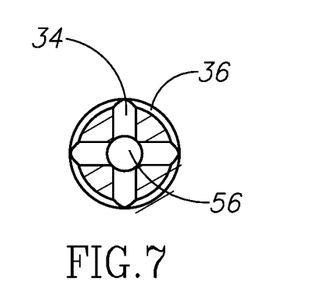
FIG. 7 is a cross-sectional view taken along line VII-VII of FIG. 6.
Figure 8:
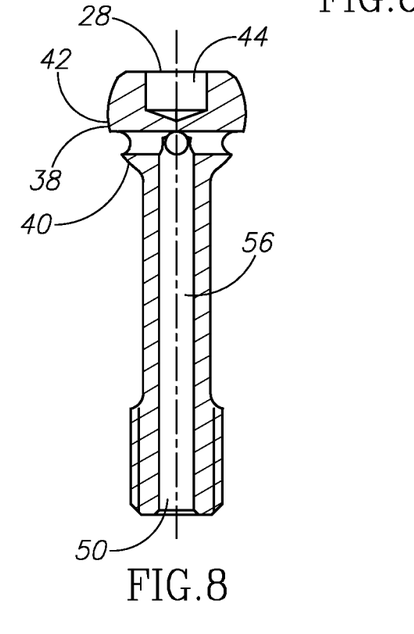
FIG. 8 is a cross-sectional view taken along line VIII-VIII of FIG. 6.
Figure 10:
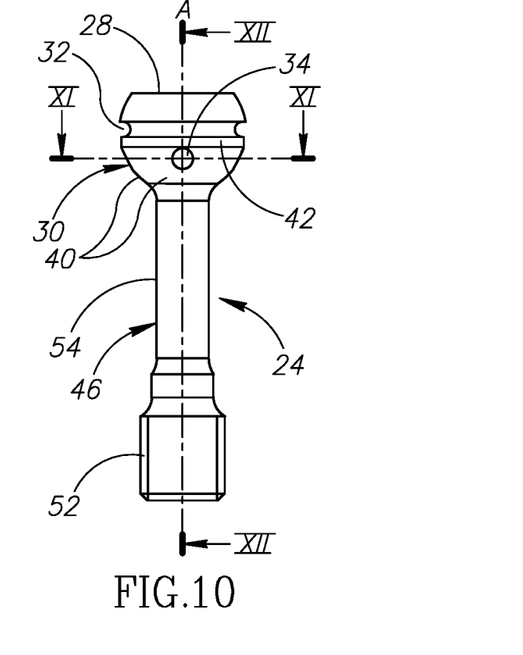
FIG. 10 is a side view of the fastener of FIG. 9.
Figure 12:
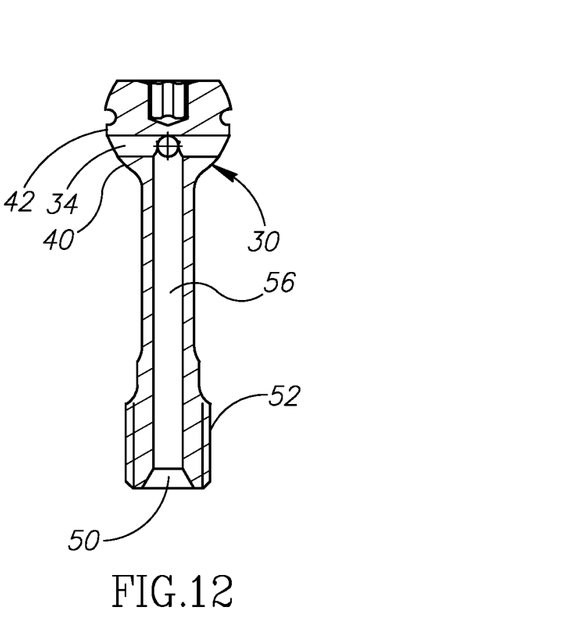
FIG. 12 is a cross-sectional view taken along line XII-XII of FIG. 10.
Figure 13:
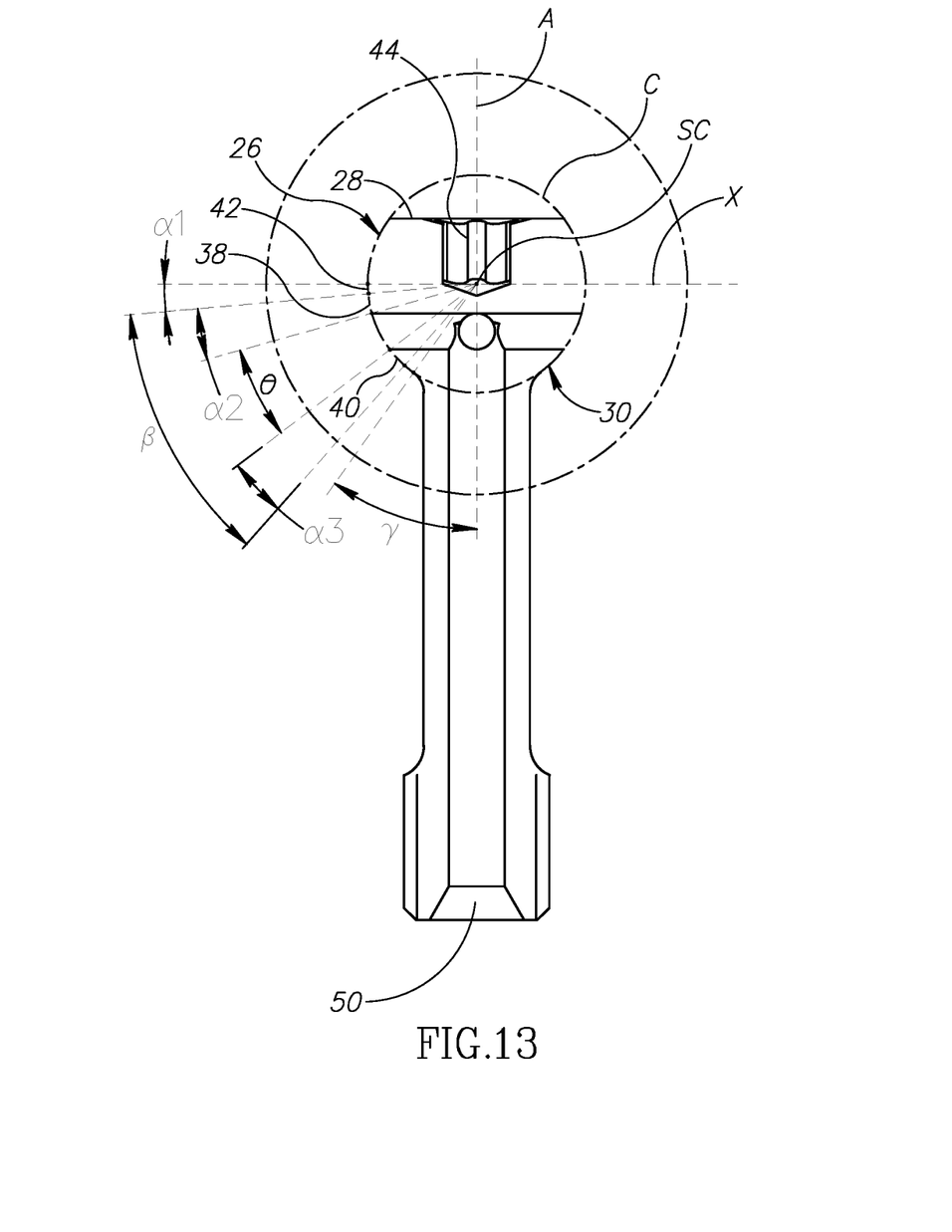
FIG. 13 is an illustration cross-sectional view taken along line XIII-XIII of FIG. 2 with the sealant recess and hatching removed.

The head peripheral surface 26 can further include a relief surface 42 which, according to the first and second embodiments, is located axially above, and can connect with, the top spherical seal surface zone 38. The relief surface 42 may be circumferentially extending, i.e., extend 360° about the rotation axis A. The relief surface 42 is not configured to provide fluid seal. In embodiments where the head 22 doesn't include a sealant recess 32, due to abutment forces, the relief surface 42 can be designed to act as a sort of border, that defines where the fluid sealing begins/ends, e.g., at an edge of the top spherical seal surface zone 38, or the sealant recess 32. The relief surface 42 is configured to reduce friction during seating of the fastener 20, as discussed further below. In the first embodiment, as depicted in FIG. 13, the relief surface 42 is inwardly recessed from a reference circle C which represents an imaginary spherical extension on which the top and bottom spherical seal surface zones 38, 40 lie. Although it may not appear so from FIG. 13, in reality the relief surface 42 is produced such that it is located slightly further inwards than the top and bottom spherical seal surface zones 38, 40. In the second embodiment, and as best seen in FIG. 6, the relief surface 42 is also inwardly recessed from the reference circle C. Thus, the relief surface 42 is inwardly recessed relative to the imaginary spherical extension C of an adjacent spherical seal surface zone to which the relief surface 42 is connected. In a third embodiment, as seen in FIGS. 10 and 12, the relief surface 42 may have a cylindrical contour, though it may follow some other shape instead. In the third embodiment, the relief surface is connected to a bottom edge of the sealant recess 32.

Attention is drawn to FIG. 5-8. In the second embodiment, the head outlets 34 open directly into a head fluid collector 36 which is formed in the spherical head abutment surface 30 and opens out thereto. The head fluid collector 36 may comprise a groove which extends around at least a portion of the head peripheral surface 26 in a direction perpendicular to the rotation axis A, but at a height below the widest portion of the head 20 in a view perpendicular to the rotation axis A. In this example, the top and bottom seal surface zones 38, 40 are therefore located anywhere above and below the head fluid collector 36 in a direction parallel to the rotation axis A. The head fluid collector 36 can extend across at least a 90 degrees sector in a cross-section perpendicular to the rotation axis A of the spherical head abutment surface 30 (FIG. 13). According to the present example, the head fluid collector 36 extends across 360 degrees, and therefore comprising a circumferentially extending groove about the head peripheral surface 26.

In the first and second embodiments, in order to maintain a fluid seal between the fastener 20 and the clamp 16, the head outlets 34 and/or the head fluid collector 36 are entirely located within the spherical head abutment surface 30 which is seated upon and engages, under pressure, a corresponding spherical seating 92 surface of the clamp 16, as will be further discussed below. In other words, according to the first and second embodiments, the head outlets 34 and/or the head fluid collector 36 open out only to the spherical head abutment surface 30.

Figure 9:
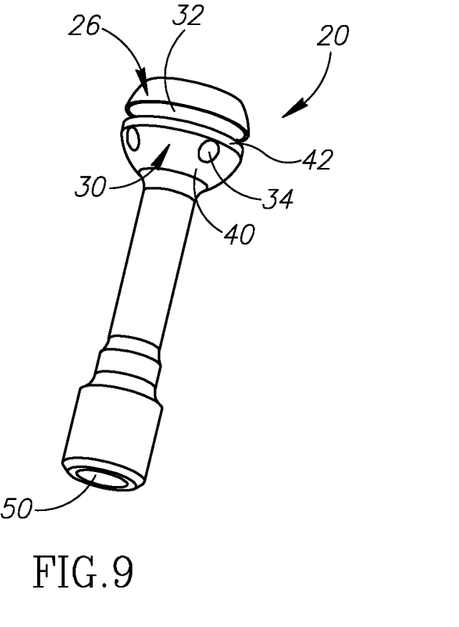
FIG. 9 is an isometric view of a third embodiment of a fastener with a sealant recess and a relief surface.
Figure 10A:
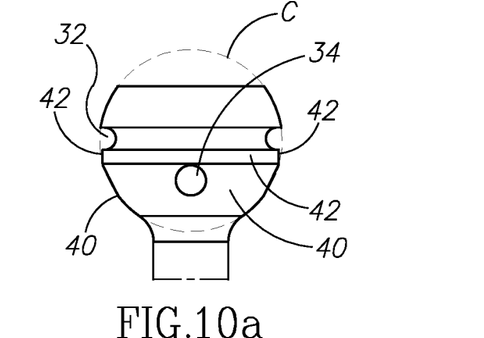
FIG. 10a is an enlarged view of a portion of FIG. 10.
Figure 11:
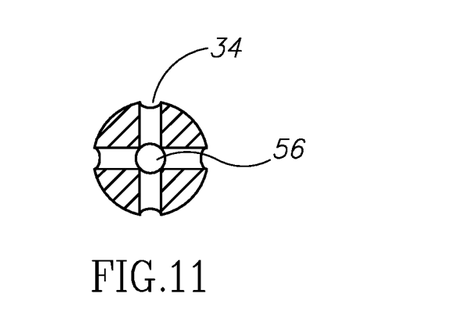
FIG. 11 is a cross-sectional view taken along line XI-XI of FIG. 10.

Attention is drawn to FIGS. 9 to 12 showing the third embodiment. According to the third embodiment, the head peripheral surface 26 does not include a top spherical seal surface zone 38 above the head outlets 34, such as seen in the first two embodiments. In the third embodiment, the head peripheral surface 26 includes the sealant recess 32 configured to accommodate the respective sealing member 33 and these serve as a primary seal above the head outlet 34. In an axial direction along the rotation axis A, the relief surface 42 extends between the head outlet 34 and the sealant recess 32. The relief surface 42 of the third embodiment is designed to facilitate rotation of the fastener 20 in some cases. Put differently, high friction forces can develop and interfere with proper tightening of the fastener 20 against the spherical seating 92 surface of the clamp 16. For example, in some scenarios, to reduce production costs either the spherical seating 92, the spherical head abutment surface 30, or both, could be produced with a relatively low surface quality. In other scenarios, also to improve cost-effectiveness, these surfaces are produced with relatively large production tolerances. As best seen in FIGS. 9, 10 and 10A, the relief surface 42 is inwardly recessed from the imaginary spherical extension, or reference circle C, and from the spherical head abutment surface 30 to which it is connected. And while the relief surface 42 in FIGS. 9 and 10 is shown as having a cylindrical contour, it is understood that the contour may follow some other shape instead.

Attention is drawn to FIG. 13. In order to illustrate the possible locations and quantify area ranges of features of the head 22 (e.g., the head outlet 34), a schematic cross-section of the fastener 20 was taken along the rotation axis A and through one of the head outlets 34. The fastener 20 of FIG. 13 represents a version of the first embodiment of FIGS. 1-4 which is devoid of the sealant recess 32. Hatching was removed from the cross section for clarity reasons. Furthermore, a reference sphere is drawn to represent the spherical head abutment surface 30, as supplemented, or extended to a complete sphere. In the cross section, the reference sphere appears as a complete reference circle C. A straight lateral (horizontal) axis X perpendicularly intersects the rotation axis A at a center SC of the reference circle C. In FIG. 13, the lateral axis X and the rotation axis A divide the reference circle C into four, equal, 90-degree quadrants, or sectors. According to the present embodiments, at least a portion of the spherical head abutment surface 30 is located below the lateral axis X, or at least in the bottom half of the reference circle C.

As an example, the following paragraphs relate to the lower left quadrant of the reference circle C in the cross section of FIG. 13.

According to some present embodiments, the head outlet 34 appears as two points in the reference circle C. Therefore, the head outlet 34 is represented by a sector defined by two radii of the reference circle C, each of which intersects a respective point thereon. The head outlet 34 is therefore defined herein by a head outlet angle $\theta$ of this sector. The head outlet angle $\theta$ can range from 5 to 70 degrees. The head outlet angle $\theta$ is preferably 22 degrees.

Similarly, the entire head spherical abutment surface 30 is represented in said cross section by a sector defined by the head spherical surface angle $\beta$. The head spherical surface angle $\beta$ ranges between 15 and 65 degrees. The head spherical surface angle $\beta$ is preferably 43 degrees.

Similarly, the relief surface 42 is defined by two points of a sector which is defined by a relief angle $\alpha 1$. The first point can be located in the lateral axis X. The relief angle $\alpha 1$ is at least 3 degrees. Preferably, the relief angle $\alpha 1$ is 5. The top end of the range of the relief angle $\alpha 1$ is affected by sector sizes of other features in the quadrant.

Similarly, the top spherical seal surface zone 38 is defined by two points of a sector which is defined by a top seal angle $\alpha 2$. According to tests, the top seal angle $\alpha 2$ is at least 5 degrees to achieve proper seal. Preferably, the top seal angle $\alpha 2$ is 11 degrees. The top end of the range of the top seal angle $\alpha 2$ is affected by sector sizes of other features in the quadrant.

Similarly, the bottom spherical seal surface zone 40 is defined by two points of a sector which is defined by a bottom seal angle α3. The bottom seal angle α3 is at least 5 degrees to achieve proper seal. Preferably, the bottom seal angle α3 is 11 degrees. The top end of the range of the bottom seal angle α3 is affected by sector sizes of other features in the quadrant.

Similarly, a fastener body half-width sector is defined by two points of a sector which is defined by a body half-width angle γ. The body half-width angle γ represents half of the body width. The bottom point is located on the rotation axis X. The body half-width angle γ is at least 15 degrees to achieve a robust fastener body 24 while also conveying fluid therethrough. Preferably, the body half-width angle γ is 35 degrees. The top end of the range of the body half-width angle γ is affected by sector sizes of other features in the quadrant.

The head top surface 28 can be planar. The head top surface 28 can include a torque transferring geometry or driving arrangement 44. The head top surface 28 can include a wrench receiving driving recess with a driving geometry such as Torx or Allen.

The fastener body 24 has a body peripheral surface 46. The body peripheral surface 46 can extend from the head 22 and can end at a body bottom surface 48. The body peripheral surface 46 extends from the head peripheral surface 26. Specifically, bottom spherical seal zone 40 of the spherical head abutment surface 30 can connect with the body peripheral surface 46 via a concave peripheral transition surface. The body bottom surface 48 includes a body opening 50 which opens out thereto. According to the present embodiments, the body opening 50 is a body inlet 50 and the body bottom surface 48 includes exactly one body inlet 50.

The fastener 20 can include a male thread 52. The male thread 52 can extend along the body peripheral surface 46 from the body bottom surface 48 towards the head 22. The male thread 52 can be coaxial with the rotation axis A The body peripheral surface 46 can include a neck 54. The neck 54 can be cylindrical, and coaxial with the rotation axis A. The neck 54 can extend from the male thread 52 to the head peripheral surface 26. The neck 54 is devoid of a thread.

The fastener 20 includes a confined, or internal, fastener fluid channel 56 which extends between, and is in fluid-communication with, the body inlet 50 and the head outlet 34. In contrast to an "external" fluid channel of the sort formed as a groove on an exterior surface of a tool element, an internal fluid channel comprises a lumen formed within the tool element. The cutting tool coupling 96 is configured to provide high-pressure fluid conveyance (normally above 60 BAR).

The tool body 18 has a tool peripheral surface 58 and a clamp recess 60 which opens out to the tool peripheral surface 58 and is configured to accommodate at least a portion of the clamp 16, as will be further explained below. The clamp recess 60 has a clamp recess peripheral surface 62 which can be cylindrical. The clamp recess 60 is larger/wider than the clamp 16, which allows movement of the clamp 16 during tightening of the fastener 20. The clamp recess 60 further has a clamp recess bottom surface 64 which connects with the clamp recess peripheral surface 62. In the present example, the fastener 20 is a screw. Therefore, the clamp recess 60 has a female threaded hole 66 into which the fastener 20 is screw threaded. The threaded hole 66 opens out to the clamp recess bottom surface 64.

Additional advantages of the spherical engagement relate to human engineering. In the current embodiments, the fastener 20 is a screw and therefore the angular displacement can be achieved in any rotational orientation about the rotation axis A. In other words, the amount of screw turns is independent of the angular displacement. Therefore, the operator doesn't have to check the amount of screw turns to achieve said angular displacement.

In this respect, yet another advantage which also relates to human engineering, as will be further disclosed below, is that the fluid conveyance between the screw 20 and the clamp 16 is also independent of the amount of screw turns. Although, proper tightening of the fastener 20 is required to ensure sealing. Thus, in some embodiments, so long as the screw 20 is properly tightened to prevent leaks, fluid, such as a liquid coolant or a liquid lubricant, is delivered to the cutting insert and/or workpiece, via the screw 20 and the clamp 16, without regard to the angular position of the screw 20 relative to the clamp 16.

Figures 17, 18:
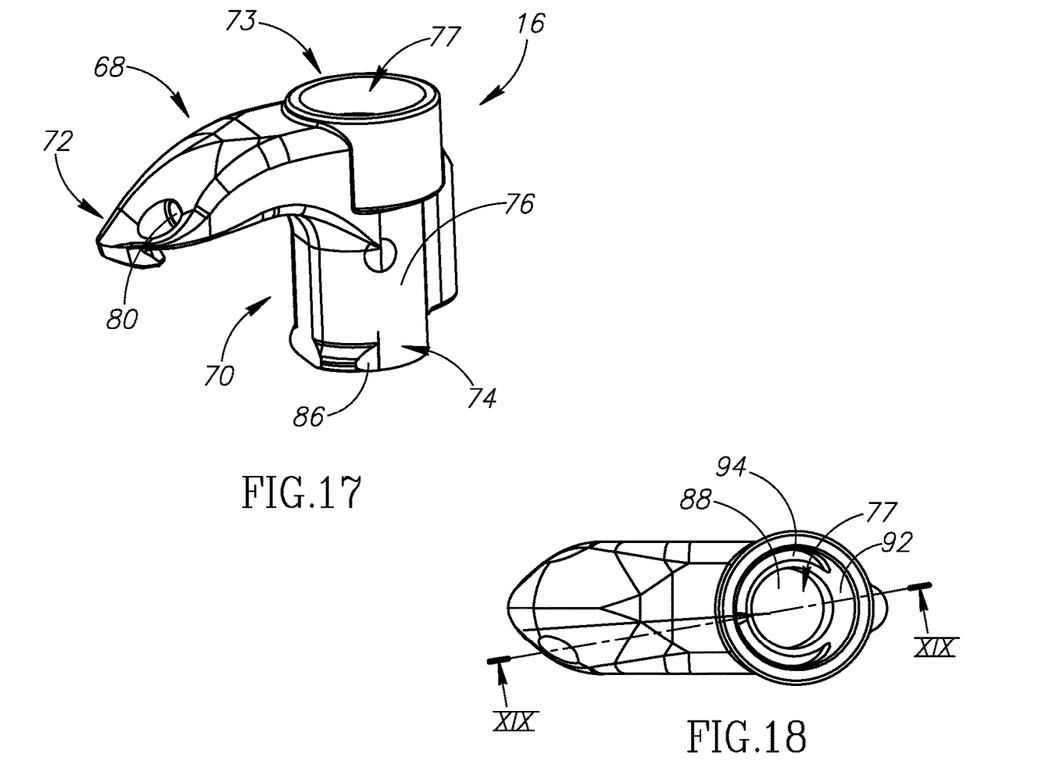
FIG. 17 is an isometric view of the clamp of FIG. 14.
FIG. 18 is a top view of the clamp of FIG. 17.
Figure 19:
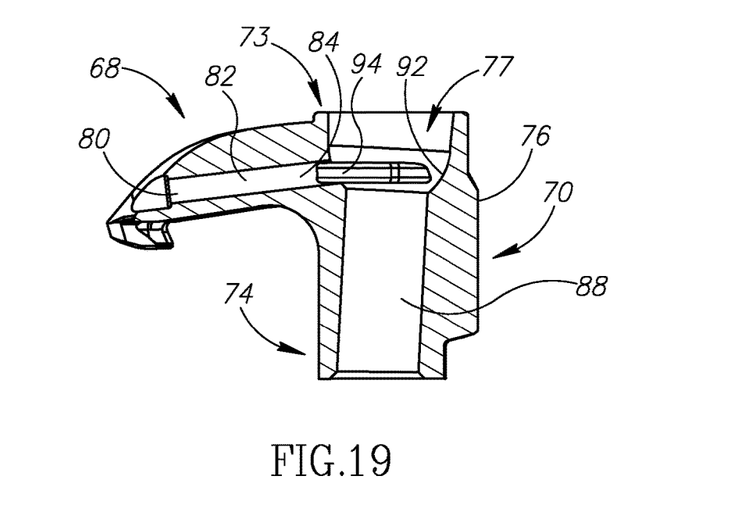
FIG. 19 is a cross-sectional view taken along line XIX-XIX of FIG. 18.

Attention is drawn to FIGS. 17-19. In a side view thereof, the clamp 16 can have a reverse L-shape. The clamp 16 has an elongated clamping portion 68 which is connected to an elongated base portion 70. The clamp 16 has a forward clamp end 72 at the clamping portion 68. The base portion 70 has a clamp peripheral surface 76, a top clamp end 73 and a bottom clamp end 74. The base portion 70 also has a receiving recess 77 which opens out to the clamp peripheral surface 76 at the top clamp end 73. As best seen in FIG. 19 and discussed further below, the receiving recess 77 includes a spherical seating surface 92 complementary to the spherical head abutment surface 30.

The clamping portion 68 extends transversely to the base portion 70. The clamping portion 68 is configured to engage and pull the insert 12 within the pocket 14—consequently securing the insert 12 in the pocket 14. To that end, the forward clamp end 72 has a hook shape which engages an insert clamping hole 78. The clamping portion 68 is also configured to deliver fluid towards the insert 12. The clamping portion 68 has a clamping portion outlet 80 which opens out at the forward clamp end 72. The clamping portion 68 also has a clamping portion channel 82 which extends from the clamping portion outlet 80 to a clamping portion inlet 84, as will be further disclosed below.

The base portion 70 can include pivot protrusions 86 at, or adjacent, the bottom clamp end 74. The pivot protrusions 86 are configured to allow said angular displacement between the clamp 16 and the tool body 18 about the pivot protrusions 86 while the fastener 20 is tightened and the insert 12 is clamped/secured.

The base portion 70 further has a fastener hole 88 which opens out at the bottom clamp end 74. The fastener hole 88 has a fastener hole axis H. The fastener hole 88 is configured to accommodate the fastener 20. Specifically, the fastener hole 88 is wider than the fastener 20, and configured to enable said angular displacement, such that the fastener 20 can move and change orientation within the clamp 16 with respect to the fastener hole 88. Specifically, the fastener hole 88 includes a generally annular displacement area 90 around the fastener neck 54 to allow said angular displacement.

The receiving recess 77 is outwardly concave. The receiving recess 77 includes a spherical seating surface 92, on which the spherical head abutment surface 30 is seated when the tool is assembled. The spherical seating surface 92 preferably has a surface area at least as large as the lower portion of the spherical head abutment surface 30. The spherical seating surface 92 preferably has the same radius as the spherical head abutment surface 30. Thus, the spherical head abutment surface 30, the spherical seating surface 92, and the displacement area 90 in the fastener hole 88 which allows for angular displacement, together result in the fastener 20 and the clamp 16 forming a ball-and-socket joint.

The clamping portion inlet 84 opens out to the spherical seating surface 92 and has at least the same surface area as, and preferably a larger surface area than, the head outlet 34. The fastener hole 88 opens out to the spherical seating surface 92. According to the present embodiment, the receiving recess 77 includes a recess fluid collector 94 which opens out to the spherical seating surface 92. In a plan view of the spherical seating surface 92 (FIG. 18), the recess fluid collector 94 can extend more than 180 degrees in a circumferential direction with the clamping portion inlet 84 at its center.

In addition to the so-called pivotal motion of the clamp 16 with respect to the tool body 18, the clamp 16 also moves backwards, in a direction away from the insert 12, and downwards, towards the clamp recess bottom surface 64.

According to the embodiment as shown in FIG. 16, the fastener 20 includes a head fluid collector 36 located below a sealant recess 32 occupied by a sealing member 33. In a secured position of the insert 12, the fastener 20 and the clamp 16—as illustrated by flow arrows—fluid passes from the tool body 18 through the body inlet 50, the fastener fluid channel 56, the head outlet 34, into the head fluid collector 36, through the clamping portion inlet 84, the clamping portion channel 82 and finally exits the clamping portion outlet 80.

In the secured position, the fastener 20 is appropriately tightened. The spherical head abutment surface 30 is seated on, and firmly abuts, the spherical seating surface 92 and provides, at least beneath the head outlets 34, the required seal.

A cutting tool clamping assembly comprising, in combination, the cutting tool clamp (16) and the cutting tool fastener (20) is suitable for replacing corresponding prior art clamp/fastener combinations in certain existing turning tool bodies. Thus, the subject matter of the present application contemplates the present clamp (16) and fastener (20) being packaged and/or marketed together.

Although the subject matter of the present application has been described to a certain degree of particularity, it should be understood that various alterations and modifications could be made without departing from the spirit or scope of the invention as hereinafter claimed.

What is claimed is:

1. A cutting tool fastener (20) having a rotation axis (A) and configured to secure together, and establish a fluid path between, two cutting tool members (16, 18), while also accommodating angular and pivotal displacement between the two, the fastener (20) comprising:
   a head (22) comprising a head peripheral surface (26) having at least one head opening (34) for emitting fluid; and
   a body (24) extending from the head (22) and comprising:
      a body peripheral surface (46);
      a body opening (50) for receiving fluid to be emitted via the head opening (34); and
      an internal fastener fluid channel (56) extending at least partially along the rotation axis (A) and in fluid-communication with the head and body openings (34, 50);
   wherein:
   the head peripheral surface (26) comprises a spherical head abutment surface (30), at least a portion of which faces towards the body (24);
   the spherical head abutment surface (30) comprises a bottom spherical seal surface zone (40);
   the head opening (34) opens out to the spherical head abutment surface (30); and
   the bottom spherical seal surface zone (40) is axially located between the body (24) and the head opening (34).

2. The fastener (20) according to claim 1, wherein:
   the spherical head abutment surface (30) comprises a head fluid collector (36); and
   the at least one head opening (34) opens out indirectly to the spherical head abutment surface (30), via the head fluid collector (36).

3. The fastener (20) according to claim 2, wherein:
   the head fluid collector (36) extends circumferentially for 360 degrees about the head peripheral surface (26).

4. The fastener (20) according to claim 1, wherein the at least one head opening (34) opens out directly to the spherical head abutment surface (30).

5. The fastener (20) according to claim 1, wherein:
   the fastener (20) is a screw which comprises a male thread (52) formed on the body peripheral surface (46) and extends along the rotation axis (A); and
   the head (22) has a driving arrangement (44).

6. The fastener (20) according to claim 5, wherein the fastener (20) further includes a non-threaded neck (54) which extends between the head (22) and the male thread (52), along the rotation axis (A).

7. The fastener (20) according to claim 1, wherein:
   the spherical head abutment surface (30) further comprises a top spherical seal surface zone (38) located above the head opening (34), away from the body (24).

8. The fastener (20) according to claim 7, wherein:
   the head peripheral surface (26) further comprises a circumferentially extending friction reducing relief surface (42) connected to the top spherical seal surface zone (38); and
   the relief surface (42) is inwardly recessed from an imaginary spherical extension (C) of the spherical head abutment surface (30).

9. The fastener (20) according to claim 1, wherein:
   the head peripheral surface (26) further comprises a circumferentially extending friction reducing relief surface (42) located above the head opening (34) away from the body (24); and wherein the relief surface (42) is inwardly recessed from an imaginary spherical extension (C) of the spherical head abutment surface (30).

10. The fastener (20) according to claim 1, further comprising:
    a circumferentially extending sealant recess (32) formed in the head peripheral surface (26) above the head opening (34), and away from the body (24); wherein:
    the sealant recess (32) is configured to receive a sealing member (33) for forming a seal.

11. The fastener (20) according to claim 1, wherein:
    the body (24) includes exactly a single body opening (50); and
    the head (22) includes exactly four head openings (34).

12. The fastener (20) according to claim 1, wherein the head (22) is wider than the body (24) in a direction perpendicular to the rotation axis (A).

13. A turning tool (10) comprising:
    a tool body (18) having a clamp recess (60) and an insert pocket (14);
    a cutting tool clamp (16) having a receiving recess (77);
    a turning insert (12) secured in the pocket (14) by the clamp (16); and the cutting tool fastener (20) according to claim 1, occupying the receiving recess (77) and securing the cutting tool clamp (16) to the tool body (18).

14. A fluid-conveyance cutting tool coupling (96) comprising:
    a first cutting tool member (18);
    a second cutting tool member (16) having a concave receiving recess (77) comprising a spherical seating surface (92); and
    a fastener (20) according to claim 1 securing the second cutting tool member (16) and the first cutting tool member (18) to one another while simultaneously establishing a fluid path therebetween; wherein:
    the spherical head abutment surface (30) of the fastener (20) abuts the spherical seating surface (92) of the second cutting tool member (16); and
    the fastener and the cutting tool members are configured such that the cutting tool members are secured to one another and the fluid path therebetween established, over a range of relative angular positions between the two cutting tool members (18, 16).

15. The cutting tool coupling (96) according to claim 14, wherein the receiving recess (77) comprises a recess fluid collector (94).

16. The cutting tool coupling (96) according to claim 14, wherein the spherical head abutment surface (30) and the spherical seating surface (92) have the same radius.

17. A cutting tool clamp (16), comprising:
    an elongated base portion (70) having a clamp peripheral surface (76) extending between a top clamp end (73) and a bottom clamp end (74), and comprising:
        a receiving recess (77) opening out to the clamp peripheral surface (76) at the top clamp end (73), and
        a fastener hole (88) connected to the receiving recess (77) and opening out at the bottom clamp end (74); and
    an elongated clamping portion (68) extending transversely from the elongated base portion (70), and comprising:
        a forward clamp end (72); and
        a clamping portion channel (82) extending between a clamping portion inlet (84) in fluid communication with the receiving recess (77) and a clamping portion outlet (80) at the forward clamp end (72);
    wherein:
    the receiving recess (77) comprises a spherical seating surface (92);
    the clamping portion inlet (84) opens out to the spherical seating surface (92); and
    the fastener hole (88) opens out to the spherical seating surface (92).

18. The cutting tool clamp (16) according to claim 17, further comprising:
    a circumferentially extending recess fluid collector (94) formed in the spherical seating surface (92) and in fluid communication with the clamping portion inlet (84).

19. The cutting tool clamp (16) according to claim 18, wherein:
    in a top view of the receiving recess (77), the recess fluid collector (94) extends more than 180 degrees in a circumferential direction, with the clamping portion inlet (84) at its center.

20. A turning tool (10) comprising:
    a tool body (18) having a clamp recess (60) and an insert pocket (14);
    the cutting tool clamp (16) according to claim 17 occupying the clamp recess (60);
    a turning insert (12) secured in the pocket (14) by the clamp (16); and
    a cutting tool fastener (20) occupying the clamp's receiving recess (77) and securing the clamp (16) to the tool body (18).

21. A cutting tool clamping assembly, comprising, in combination:
    the cutting tool fastener (20) according to claim 1; and
    the cutting tool clamp (16) according to claim 17.

22. A turning tool (10) comprising:
    a tool body (18) having a clamp recess (60) and an insert pocket (14);
    the cutting tool fastener (20) according to claim 1;
    the cutting tool clamp (16) according to claim 17 occupying the clamp recess (60); and
    a turning insert (12) secured in the insert pocket (14) by the cutting tool clamp (16); wherein:
    the cutting tool fastener (20) occupies the clamp's receiving recess (77) and secures the clamp (16) to the tool body (18);
    the spherical head abutment surface (30) is seated on the spherical seating surface (92);
    the spherical seating surface (92) and the spherical head abutment surface (30) have the same radius; and
    the spherical head abutment surface (30), the spherical seating surface (92), and the displacement area (90) in the fastener hole (88) allow for angular displacement between the fastener (20) and the clamp (16) thereby forming a ball-and-socket joint.

23. The fastener (20) according to claim 2, further comprising:
    a circumferentially extending sealant recess (32) formed in the head peripheral surface (26) above the head opening (34), and away from the body (24); wherein:
    the sealant recess (32) is configured to receive a sealing member (33) for forming a seal.

24. The fastener (20) according to claim 7, further comprising:
    a circumferentially extending sealant recess (32) formed in the head peripheral surface (26) above the head opening (34), and away from the body (24); wherein:
    the sealant recess (32) is configured to receive a sealing member (33) for forming a seal.

25. The fastener (20) according to claim 9, further comprising:
    a circumferentially extending sealant recess (32) formed in the head peripheral surface (26) above the head opening (34), and away from the body (24); wherein:
    the sealant recess (32) is configured to receive a sealing member (33) for forming a seal.

* * * * *